March 17, 1953     O. J. POUPITCH     2,631,345
DOUBLE SNAP MOLDING CLIP
Filed June 11, 1951
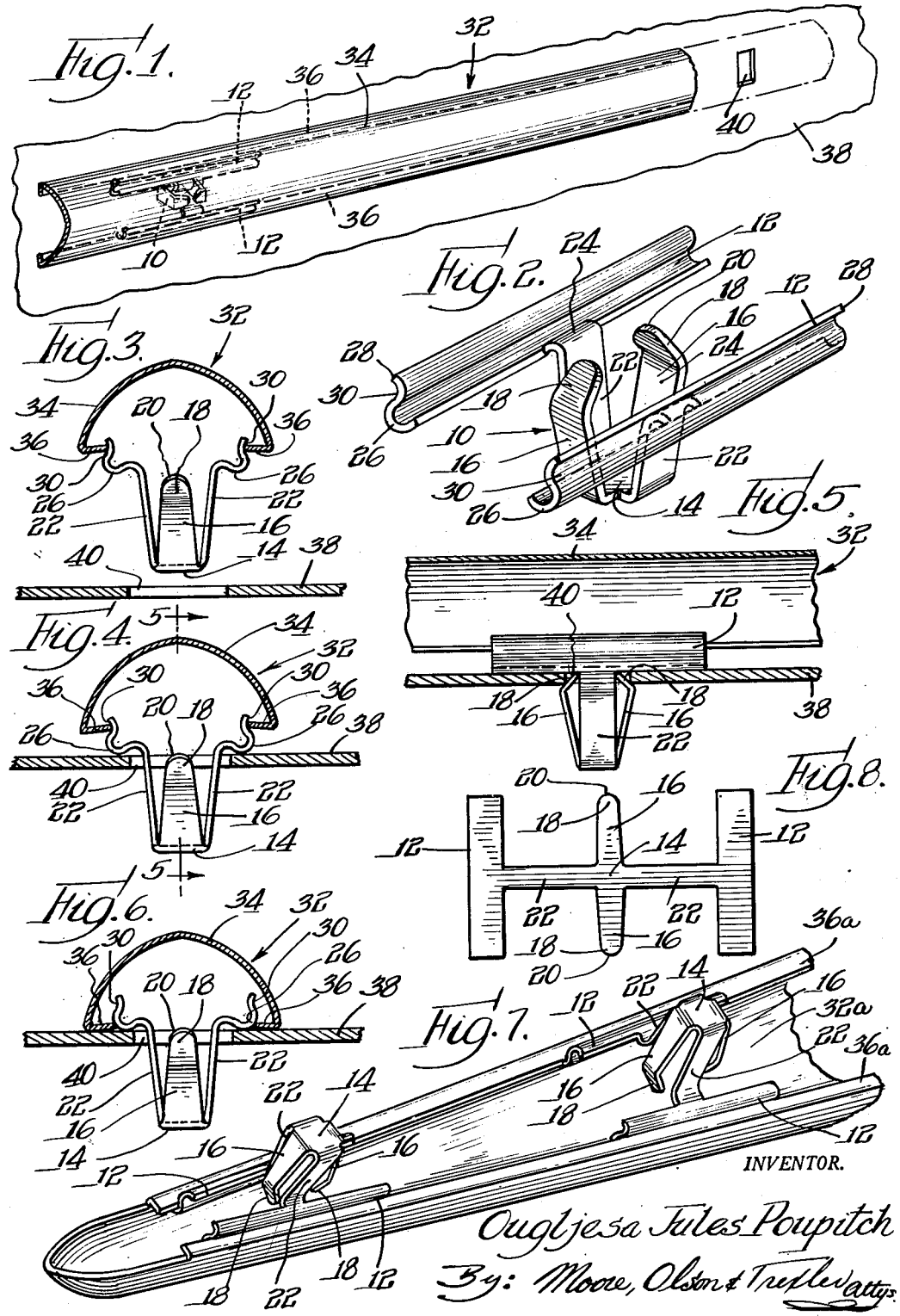
INVENTOR.
Ougljesa Jules Poupitch Patented Mar. 17, 1953

2,631,345

UNITED STATES PATENT OFFICE 2,631,345

DOUBLE SNAP MOLDING CLIP

Ougljesa Jules Poupitch, Itasca, Ill., assignor to Illinois Tool Works, Chicago, Ill., a corporation of Illinois Application June 11, 1951, Serial No. 230,880

7 Claims. (Cl. 24—73)

This application relates generally to fastening devices and particularly to fastening devices capable of being used to secure molding strips and the like in place.

Various clips heretofore have been constructed for securing molding strips in place. Such clips generally have been usable with only one size molding strip and therefore it has been necessary to utilize clips of different sizes for securing tapered moldings in place. Other clips have been devised having non-circular head portions rotatable into position to bridge a channeled molding strip and thus to secure molding strips of different sizes or to secure tapered molding strips.

An object of this invention is to provide a clip for securing moldings or the like, said clip having an elongated head adapted to engage the molding over a substantial length and thereby affording increased stability and improved adaptation to secure tapered moldings.

Another object of this invention is to provide an improved molding clip receivable in an aperture in a work panel in constant position regardless of the width of the molding or the like to be secured by the clip.

Another object of this invention is to provide a clip for securing tapered moldings wherein the clip has spring members engageable with a molding to force the molding tightly against a panel.

A further object of this invention is to provide a molding clip adapted to be preassembled with the clip head engaging a molding in one position allowing utmost freedom of the clip for assembly and engaging the molding in another position to secure the molding snugly against a panel.

Other and further objects and advantages of the present invention will be apparent from the following description when read in connection with the accompanying drawing wherein:

Fig. 1 is a perspective view showing a molding secured by the clips disclosed herein;

Fig. 2 is a perspective view of the clip;

Fig. 3 is a cross-sectional view of a molding showing a clip partially assembled therewith before insertion in a work panel;

Fig. 4 is a view similar to Fig. 3 showing the clip inserted in the work panel;

Fig. 5 is a longitudinal sectional view as taken along the line 5—5 of Fig. 4;

Fig. 6 is a view similar to Figs. 3 and 4 showing the molding in final position against the panel;

Fig. 7 is a perspective view of the back side of a molding strip showing clips preassembled therewith; and Fig. 8 shows the clip blank as originally struck from sheet metal and previous to folding and bending.

The molding clip forming the subject matter of this invention may be seen most clearly in its over-all aspects in the perspective view of Fig. 2. The molding clip includes a body portion 10 and a head including a pair of arms 12. The body portion 10 includes an end section 14 which in the disclosed embodiment is substantially square in configuration, but may be any shape to adapt it for its particular use. Elongated mounting or snap in fingers 16 extend from opposite sides of the end section 14. The fingers diverge slightly and are terminated by inturned tips 18 which are disposed at obtuse angles relative to the main portions of the fingers 16 and which are curved at their extremities at 20.

A pair of legs 22 extends from the two remaining edges of the end portion 14. The legs 22 diverge slightly and are reversely bent at 24 at a distance from the end portion 14 substantially equal to the end to end length of each of the fingers 16 including the inturned tips 18 thereon. The reversely bent leg portions 24 are formed integrally with the arms 12 which are considerably elongated transversely of the body portion 10. Each of the arms 22 presents a substantially S-shaped cross section affording a retaining shoulder 26 and an outer edge or lip 28, a groove 30 being defined between each shoulder 26 and lip 28.

The clip forming the subject matter of this invention is stamped from sheet metal as shown in Fig. 8 and is substantially in the form of a pair of letter E's arranged back to back. The arms 12, legs 22, and fingers 16 including the tips 18 thereof then are bent into the configuration shown in Fig. 2 and described heretofore. The clip then preferably is heat treated to render it resilient.

A molding such as may be secured by my clip is illustrated in Figs. 1 and 3–6 and is identified generally by the numeral 32. The molding 32 comprises an elongated, substantially channel-shaped central body portion 34 of any desired configuration and having longitudinally extending inturned flanges 36 opposing one another along the opposite longitudinal edges of the central body portion. The molding is adapted to be secured to a panel 38, such as the side of an automobile body, and this panel includes spaced apertures 40. In Fig. 1, part of the molding or molding strip 32 has been broken away and the portion removed is shown in dotted lines in order best to illustrate the cooperation of the molding with the apertures 40. In order to mount the molding 32 on the panel 38, several of the molding clips are preassembled with the molding in spaced relation in accordance with the spacing between the apertures 40. The clips are preassembled with the molding strip by flexing the legs 22 slightly toward one another to engage the molding flanges 26 with the grooves 30 of the clip head as shown in Fig. 3. The various clips then are positioned in the apertures 40, the fingers 16 flexing toward one another entirely independently of the arms 12 and then springing outwardly with the tips 18 impinging against opposite edges of the apertures 40 as shown in Figs. 4 and 5. With the molding mounted on the grooves 30 as just set forth, the clips have utmost freedom and their positions relative to the apertures 40 readily can be gauged visually. After the clips have been inserted in the position shown in Figs. 4 and 5, continued pressure on the molding strip 32 causes the flanges 36 to clamp or snap over and beneath the shoulders 26 as shown in Fig. 6. The narrowness of the fingers 16 compared with the legs 22 and the favorable camming angle of the fingers 16 and edges of the apertures 40 compared with the camming angles between the arm shoulders 26 and molding flanges 36 insures complete seating of the clips before engagement of the flanges behind the shoulders. The resiliency of the clip including the arms 12 causes the shoulders 26 to clamp the flanges 36 against the channel 38 to draw the molding tightly into place.

The molding clips as disclosed herein have particular applicability to the mounting of tapered moldings as may be seen in Fig. 7. Toward the right hand end of the molding section 32a shown in Fig. 7, the flanges 36a are relatively far apart and the clip legs 22 diverge as in Figs. 3, 4 and 6. As the confronting flanges 36a are not parallel, the legs 22 twist slightly to allow the arms 22 to engage the flanges 36a throughout the lengths of the arms. At the left hand end of the molding clip in addition to the twisting of the arms 22, the arms are deflected toward one another due to the close approach of the flanges 36a to one another at that location.

The flexing of the legs 22 toward one another is accomplished relatively readily due to the length of the legs 22. The length of the arms 12 results in greater stability of the clips on the molding and further provides long lever arms twisting the legs 22, and the length of these legs allows them to twist readily, to allow the arms 12 to secure the moldings 32a over substantial lengths rather than with essentially point contact as is done with many other clips. As the fingers and tips 18 thereon are joined to the legs 22 only through the intermediary of the end section 14, twisting and flexing of the legs 22 has no effect on the fingers 16 which continue to engage the opposite sides of each aperture 40 as before.

The clip disclosed herein is admirably suited for securing moldings or the like having different transverse dimensions and particularly is adapted for mounting tapered moldings. The clips are assembled with a molding in a position affording utmost freedom of the clips and the clips then readily are inserted in apertures in a work panel, the inserted position being independent of the proximity or relative angular disposition of the longitudinal flanges of the molding. The clip is simply and economically fabricated and secures moldings, particularly tapered moldings, with a facility and snugness heretofore unknown in the art.

The embodiment of the invention herein shown and described is for illustrative purposes only. Various changes obviously can be made within the spirit and scope of the appended claims and the right hereby is reserved to make such changes.

I claim:

1. A spring clip including a pair of retaining members each having a shoulder adapted to engage and secure opposed longitudinal edges of a channeled work piece and a retaining lip spaced outwardly from said shoulder and reversely bent relative thereto, said retaining lips also being adapted to engage and secure said opposed longitudinal edges whereby said clip can be preassembled with a channeled work piece and extend therefrom for assembly with an apertured panel, spring means interconnecting said pair of retaining members whereby the spacing therebetween can be varied to accommodated channeled work pieces having oppositely disposed longitudinal edges spaced variantly, and attaching means joined to said spring means and adapted to fit within an aperture to secure said channeled work piece against a panel.

2. A spring clip including a head portion having elongated arms, each of said arms having elongated shoulder portions adapted to engage opposed longitudinal edges of a channeled work piece to secure said work piece against a panel and a lip reversely bent relative to said shoulder, said lips being adapted to engage said opposed edges for preassembly of said clip and said channeled work piece, spring means interconnecting said arms whereby the spacing between said arms can be varied to accommodate channeled work pieces having opposed longitudinal edges spaced variantly, and attaching means joined to said spring means and adapted to fit within an aperture to secure said channeled work piece against a panel.

3. A spring clip including a pair of elongated, relatively narrow spring legs, means interconnecting said legs at one end of each of said legs, an elongated arm on the free end of each of said legs and arranged transversely relative thereto, each of said arms including an elongated retaining lip adapted to engage opposed longitudinal edges of a channeled work piece for preassembly of said clip and work piece and further including a retaining shoulder spaced inwardly from said lip to secure said channeled work piece against a panel, said elongated spring legs readily flexing and twisting to facilitate assembly of said clip with said work piece, and attaching means interconnected with said legs and adapted to fit within an aperture to secure said channeled work piece against a panel.

4. A one-piece sheet metal spring clip for channeled work pieces having opposed inturned flanges, and comprising a stud section including opposed latching fingers operable to secure the clip within an aperture of the work piece, a head section including an opposed pair of T-shaped members, the legs of said T-shaped members being connected at the entering end of said stud section and being elongated and relatively narrow throughout their lengths from the said entering end of the stud section to a point adjacent the free ends of said latching fingers whereby to permit torsional twisting thereof along their longitudinal axes, the cross arms of said T-shaped members providing heads engageable with the inturned flanges of the channeled work piece and being relatively rigid and elongated to extend substantially laterally beyond the free ends of said latching fingers and provide lever arms of substantial mechanical advantage effective to cause torsional twisting of the said legs when subjected to rotational forces resulting from the arms accommodating themselves to a channeled work piece of varying width, and each of said cross arms having disposed therealong an outward shoulder including inwardly and upwardly inclined surfaces facilitating the passage thereover of the inturned flanges of the work piece into interfitting engagement with the shoulders.

5. A one-piece sheet metal spring clip as claimed in claim 4, wherein the free ends of the latching fingers are provided with shoulder portions disposed to engage the edge of a work piece aperture in opposition to the shoulders on said cross arms.

6. A one-piece sheet metal spring clip as claimed in claim 5, wherein the latching fingers flare outwardly from the entering end of the stud section and having the free extremities thereof directed toward each other to provide the shoulder portions.

7. A one-piece sheet metal spring clip as claimed in claim 4, wherein each of the cross arms is provided with an elongated outwardly directed lip portion above the shoulders and providing a recess for engaging the inturned flanges of the channeled work piece.

OUGLJESA JULES POUPITCH.

REFERENCES CITED

The following references are of record in the file of this patent:

UNITED STATES PATENTS

| Number | Name | Date |
| --- | --- | --- |
| 2,133,366 | Van Uum | Oct. 18, 1938 |
| 2,171,925 | Fitts | Sept. 5, 1939 |
| 2,300,478 | Wiley | Nov. 3, 1942 |
| 2,521,354 | Flora | Sept. 5, 1950 |
| 2,567,903 | Bedford | Sept. 11, 1951 |